US008995963B2

(12) United States Patent  (10) Patent No.: US 8,995,963 B2
Agre et al.  (45) Date of Patent: Mar. 31, 2015

(54) SYSTEM AND METHODS FOR CONTROLLING ADVERTISEMENTS ON WIRELESS DEVICE ASSETS

(75) Inventors: Daniel H. Agre, Ranch Santa Fe, CA (US); Nakul Duggal, San Diego, CA (US); Vikram Yashpal, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1086 days.

(21) Appl. No.: 12/023,656

(22) Filed: Jan. 31, 2008

(65) Prior Publication Data

US 2009/0197577 A1  Aug. 6, 2009

(51) Int. Cl.
*H04M 3/42* (2006.01)
*G06Q 30/02* (2012.01)
*H04M 3/487* (2006.01)

(52) U.S. Cl.
CPC ............ *G06Q 30/02* (2013.01); *H04M 3/4878* (2013.01)
USPC ..... 455/414.1; 455/405; 455/406; 455/412.2; 455/418; 455/466; 370/312

(58) Field of Classification Search
CPC ................... H04L 29/08108; H04M 2215/32; H04M 4/02; H04M 4/24; H04M 4/12; H04M 4/14; H04W 72/005
USPC ............... 455/414.1–4, 405, 406, 412.2, 418, 455/466; 370/312
See application file for complete search history.

(56) References Cited

U.S. PATENT DOCUMENTS

| 6,084,628 | A | * | 7/2000 | Sawyer ............................. 725/34 |
| 6,114,969 | A | * | 9/2000 | Hymel .......................... 340/7.48 |
| 6,282,713 | B1 | * | 8/2001 | Kitsukawa et al. .............. 725/36 |
| 6,681,114 | B2 | * | 1/2004 | Chang et al. ................ 455/456.3 |

(Continued)

FOREIGN PATENT DOCUMENTS

| CN | 1666542 A | 9/2005 |
| JP | 2001352403 A | 12/2001 |

(Continued)

OTHER PUBLICATIONS

International Search Report and Written Opinion—PCT/US2009/032544—ISA/EPO—Apr. 8, 2011.

(Continued)

*Primary Examiner* — Steve D Agosta
(74) *Attorney, Agent, or Firm* — Abdollah Katbab

(57) ABSTRACT

Methods, systems, apparatus and computer program products are described for controlling content presented on user-controlled wireless device assets and/or features, such as ringtone, wallpaper, wireless device memory and the like. In present aspects, a user-requested control state change is undertaken from a user-controlled state to an advertisement-control state. In this regard, once the user has conceded control of the wireless device asset over to an advertiser or advertisement provider, the advertiser is allowed to provide advertisements to the designated wireless device asset for a predetermined period of time. From the advertiser or advertisement provider perspective present aspects provide for advertisements to be presented on novel platforms. Additionally, by gaining control over the wireless device asset the advertisers or advertisement providers are assured that their advertisements will be executed for the duration of the control period.

30 Claims, 7 Drawing Sheets

(56) References Cited

U.S. PATENT DOCUMENTS

| | | | |
|---|---|---|---|
| 7,003,478 B1* | 2/2006 | Choi | 705/14.73 |
| 7,089,194 B1* | 8/2006 | Berstis et al. | 705/14.54 |
| 7,263,351 B2 | 8/2007 | Ross et al. | |
| 7,813,954 B1* | 10/2010 | Price et al. | 705/14.1 |
| 2001/0047294 A1* | 11/2001 | Rothschild | 705/14 |
| 2002/0000984 A1 | 1/2002 | Asai et al. | |
| 2002/0116269 A1 | 8/2002 | Ishida | |
| 2003/0162534 A1 | 8/2003 | Lee | |
| 2005/0077997 A1 | 4/2005 | Landram et al. | |
| 2005/0192861 A1 | 9/2005 | Nakazawa et al. | |
| 2005/0203835 A1* | 9/2005 | Nhaissi et al. | 705/39 |
| 2007/0116227 A1 | 5/2007 | Vitenson et al. | |
| 2007/0198443 A1 | 8/2007 | Chernev et al. | |
| 2008/0109840 A1* | 5/2008 | Walter et al. | 725/25 |

FOREIGN PATENT DOCUMENTS

| | | |
|---|---|---|
| JP | 2002073949 A | 3/2002 |
| JP | 2002165010 A | 6/2002 |
| JP | 2002245342 A | 8/2002 |
| JP | 2004252498 A | 9/2004 |
| JP | 2006277595 A | 10/2006 |
| JP | 2007183766 A | 7/2007 |
| JP | 2009522876 A | 6/2009 |
| WO | WO2007084246 A2 | 7/2007 |
| WO | WO2007098333 | 8/2007 |

OTHER PUBLICATIONS

EPO: "Mitteilung des Europäischen Patentamts vom Oct. 1, 2007 über Geschäftsmethoden = Notice from the European Patent Office dated Oct. 1, 2007 concerning business methods = Communiqué de l'Office européen des brevets,en date du Oct. 1, 2007, concernant les méthodes dans le domaine des activités", Journal Officiel De L'Office Europeen Des Brevets.Official Journal of the European Patent Office.Amtsblattt Des Europaeischen Patentamts, OEB, Munchen, DE, vol. 30, No. 11, Nov. 1, 2007, pp. 592-593, XP007905525, ISSN: 0170-9291.
Supplementary European Search Report—EP09708706—Search Authority—Munich—May 30, 2012.
Taiwan Search Report—TW098103259—TIPO—Jul. 9, 2012.

* cited by examiner

SYSTEM AND METHODS FOR CONTROLLING ADVERTISEMENTS ON WIRELESS DEVICE ASSETS

BACKGROUND

1. Field

The described aspects relate to wireless communication, and more particularly, to methods, systems and apparatus for controlling content, such as advertising content, associated with wireless device assets and/or features, such as memory, wallpaper, ringtone and the like.

2. Background

Wireless communication networks have been designed to deliver media content to recipients. For example, wireless communication networks may comprise a broadcast or multicast system, which transmit information to multiple recipients at the same time. One such example of such as system is the MediaFLO™ system, available from QUALCOMM Incorporated of San Diego, Calif. In addition to delivering broadcast programming, these types of media distribution systems are especially suited for delivering advertising content, otherwise referred to as advertisements or ads, to wireless communication devices, such as cellular telephones and the like.

Conventionally, advertisements have been displayed in conjunction with consumption of other media content on the wireless device. For example, if the wireless device is receiving real-time broadcast/multicast media content, such as a live sporting event broadcast, advertisements may be inserted during breaks in the sporting event. In other example, in which the wireless device downloads media content, such as a broadcast/multicast program, on a regular schedule and stores the media content for subsequent consumption, the media content may be configured with advertisement slots for insertion of advertisements. In addition to multimedia broadcast/multicast content, audio content, such as music files, may be broadcasted, multicasted or otherwise uni-casted. In such instances, video advertisements may be displayed on the wireless device while the audio content is being played.

Recently, advertisers and/or advertisement providers have developed further methods for advertising on wireless communication devices. For example, advertisers and/or advertisement providers have provided users incentives for agreeing to accept and execute the advertiser's and/or advertisement provider's advertisements on the wireless device. The incentives have included gratuitous wireless service, reduced wireless service rates, reduced cost of the wireless device and the like. Once the user has accepted the offer, the advertiser's and/or advertisement provider's advertisements are communicated to the device, stored in memory for a predetermined period and are either exclusively played or played more frequently than any other advertisements during advertisement slots in broadcast/multicasted media content. However, even in this advertisement scenario the advertiser has limited assurance that their advertisements are being viewed by the user who may choose to ignore the advertisement during the time in which it is being executed or displayed.

From the user perspective, the user may desire to have some control over which advertisement it receives and subsequently executes on the device. For example, the user may have certain allegiance with a product or service such that advertising that particular product or service is favorable to the user. In addition, the user may have current or ongoing interests in a certain product or service. For example, a product or service that the user has an immediate need to purchase or purchases regularly. In this instance a user may be more willing to receive advertisements associated with such products and service because the content of the advertisements is highly relevant to the user's current needs.

Therefore, advertisers and advertisement providers desire new means for providing and executing advertising on wireless devices. In this regard, the desired means should not be limited to presenting advertisements in designated advertisement slots during broadcast/multicast programming or any other conventional manner in which advertisements are normally presented. The desired advertisement platform should insure that the advertiser's advertisements receive maximum exposure on the wireless device and, in some instances, provide for advertisement exposure beyond the user of the device. In addition the desired advertisement scheme should allow for the user of the wireless device to choose which type of advertisements to receive or define and other restrictions related to the execution of the advertisement on the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented infra.

Thus, present aspects provide systems, methods and apparatus for controlling content presented on user-controlled wireless device assets and/or features. Wireless device assets and/or features may be defined as any user-controlled function or application performed by the device or any user-controlled mechanism in the device capable of storing, presenting or executing advertisements. For example, wireless device assets may include, but are not limited to, ringtones, display wallpaper, device memory and the like. In present aspects, implementing a user-requested control state change from a user-controlled state to an advertisement control state controls content that is presented or stored in the wireless device asset. In this regard, once the user has conceded control of the wireless device asset over to an advertiser or advertisement provider, the advertiser is allowed to provide advertisements to the designated wireless device asset for a predetermined period of time.

Additionally, present aspects may provide for the user of the wireless device to choose or otherwise designate which type of advertisements may be associated with a designated wireless device asset or feature or the amount and/or type of control that the advertiser may be provided for a specific control designation.

As such, present aspects provide advertisers and/or advertisement providers a unique means of presenting advertisements on wireless devices, such as, by way of example, ringtone advertisements, wallpaper advertisements and the like. In addition, present aspects allow the advertiser or advertisement provider to gain control over the user's asset for the predetermined period of time, thus insuring that the advertisements maintain maximum exposure/viewing over the duration of the control period. By controlling the asset for the designated time period the advertiser can provide time-sensitive advertisements, time-sequenced advertisements, location-sensitive advertisements and the like. Additionally, platforms such as ringtones and wallpapers provide for advertising exposure beyond the user and may include any one else who hears a ringtone or views the device's display.

According to one aspect, a method for providing advertisements to user-designated wireless device assets is defined. The method includes receiving a notification from a wireless device indicating user-controlled wireless device assets having a user-implemented control state change from a user-controlled state to an advertisement-controlled state, and providing advertisements to the wireless device for use by the user-controlled wireless device assets indicated in the notification.

The notification may optionally include advertisement parameters, which may be user-determined advertisement parameters, which define acceptable advertisements for the designated user-controlled wireless device assets. Additionally, the notification may include a user-determined period of time for the advertisement-controlled state associated with the user-controlled wireless device asset. In this regard, providing advertisements to the wireless device may further include providing advertisements with an associated timestamp operable to expire after the period of time for the advertisement-controlled state.

In one aspect of the method the user-controlled wireless device asset is the ringtone. As such the advertisements that are provided to the wireless device when the state indicated advertisement-control state may include any known or future known ringtone advertisement. For example, the ringtone advertisement may include a ringtone advertisement replacement operable to be executed in place of a pre-existing ringtone, a ringtone insertion advertisement operable to be executed in conjunction with the pre-existing ringtone or a visual advertisement that is operable to be displayed in conjunction with the execution of the pre-existing ringtone.

In another aspect of the method the user-controlled wireless device asset is the display wallpaper. As such the advertisements that are provided to the wireless device asset when the state indicates advertisement control state may include any known or future known wallpaper advertisement. For example, the wallpaper advertisement may include a wallpaper advertisement replacement operable to be displayed on the wireless device in place of pre-existing wallpaper or a wallpaper advertisement overlay that is operable to be displayed on the wireless device asset in conjunction with the pre-existing wallpaper.

Further, in another aspect of the method the user-controlled wireless device asset is defined as a portion of the wireless device memory. As such, the advertisements that are provided to the wireless device asset when the state indicates advertisement-control state may include any known or future known video, audio or multimedia advertisement. Collectively, the advertisements provided may have a size less than or equal to the portion of the wireless device memory that has been designated for advertisement storage.

In a related aspect, at least one processor is provided that is configured to provide advertisements to user-controlled wireless device assets The processor includes a first module for receiving a notification from a wireless device indicating user-controlled wireless device assets having a user-implemented control state change from a user-controlled state to an advertisement-controlled state, and a second module for providing advertisements to the wireless device for use by the designated user-controlled wireless device assets indicated in the notification.

A further related aspect is provided for by a computer program product that includes a computer-readable medium. The medium includes at least one instruction for causing a computer to receive a notification from a wireless device indicating user-controlled wireless device assets that have a user-implemented control state change from a user-controlled state to an advertisement-controlled state. The medium also included at least one instruction for causing the computer to provide advertisements to the wireless device for use by the user-controlled wireless device assets indicated in the notification.

Yet another related aspect is defined by an apparatus. The apparatus includes means for receiving a notification from a wireless device one or more user-controlled wireless device assets having a user-implemented control state change from a user-controlled state to an advertisement-controlled state and means for providing one or more advertisements to the wireless device for use by the at least one user-controlled wireless device asset indicated in the notification.

A further aspect is provided for by a network device or system for providing advertisements to user-controlled wireless device assets. The network device includes a computer platform including at least one processor and a memory. The network device further includes an advertising module stored in the memory and executable by the at least one processor. The advertising module is operable to receiving a notification from a wireless device indicating at least one user-controlled wireless device asset having a user-implemented control state change from a user-controlled state to an advertisement-controlled state and is operable to provide advertisements to the wireless device for use by the at least one user-controlled wireless device asset indicated in the notification.

In certain aspects of the network device, the advertising module may be further operable to provide the wireless device with an asset control state change request operable to allow a user of the wireless device to implement a control state change from the user-controlled state to the advertisement-controlled state for one or more indicated wireless device assets. In other aspects of the network device, the advertising module is further operable to receive the notification including advertisement parameters, which may be user-determined parameters, which define acceptable advertisements for the at least one user-controlled wireless device asset.

In some aspects of the network device the advertising module is further operable to receive the notification indicating that the user-designated wireless device asset is a ringtone. In such aspects, the ringtone may be an advertisement ringtone replacement that is operable to be executed in place of a pre-existing wireless device ringtone, a visual advertisement that is operable to be visually displayed on the wireless device in conjunction with the execution of the pre-existing wireless device ringtone or an advertisement ringtone insertion that is operable to be periodically inserted during the execution of a wireless device ringtone.

In other aspects of the network device the advertising module is further operable to receive the notification indicating that the user-designated wireless device asset is wallpaper. In such aspects, the wallpaper may be an advertising wallpaper replacement that is operable to be displayed on the wireless device in place of pre-existing wireless device wallpaper or a wallpaper advertisement overlay that is operable to be displayed on the wireless device in conjunction with the pre-existing wireless device wallpaper.

In further aspects of the network device the advertising module is further operable to receive the notification indicating that the user-designated device asset is a portion of wireless device memory. In such aspects, the advertising may be any audio, video and/or multimedia advertising having a collective size less than or equal to the size of the portion of the wireless device memory.

Yet another aspect is defined by a method for user-implemented control state change of wireless device assets. The method includes providing notification of a user-implemented control state change from a user-controlled state to a advertisement-controlled state for one or more user-designated wireless device assets and receiving, in response to the notification, one or more advertisement associated with the one or more wireless device assets. The method additionally includes executing the advertisements associated one or more wireless device assets for a predetermined period of time.

In some aspects the method may additionally include receiving a request to change the control state of at least one wireless device asset from the user-controlled state to the advertisement-controlled state prior to providing the notification. In such aspects the request may further include an offer to compensate the user for agreeing to change the control state from the user-controlled state to the advertisement-controlled state for one or more of the wireless device assets. The request may further provide for the user to designate advertisement parameters that define acceptable advertisements for the at least one user-controlled wireless device asset. As such, the notification may further provide for the user-determined advertisement parameters defining acceptable advertisements for the at least one user-controlled wireless device asset.

In some aspects of the method the notification that is provided may further include a user-determined time period for the control state change, which provides for the user to designate the period of time for which the identified asset or assets will be under advertisement control.

In one aspect of the method providing the notification further includes providing notification of a user-implemented control state change from a user-controlled state to an advertisement-controlled state for a wireless device asset defined as a ringtone. In such aspects, the ringtone advertisement that is received, in response to the notification, may include at least one of a ringtone advertisement insertion operable to be periodically executed during a pre-existing ringtone, a visual advertisement operable to be displayed in conjunction with the pre-existing ringtone or a ringtone advertisement replacement operable to be executed in the place of the pre-existing ringtone.

In another aspect of the method providing notification further includes providing notification of a user-implemented control state change from a user-controlled state to an advertisement-controlled state for a wireless device asset defined as wallpaper. In such aspects, the wallpaper advertisement that is received, in response to the notification, may include at least one of a wallpaper advertisement overlay operable to be displayed in conjunction with pre-existing wallpaper or a wallpaper advertisement replacement operable to be displayed in the place of pre-existing wallpaper.

In yet another aspect of the method providing notification further includes providing notification of a user-implemented control state change from a user-controlled state to an advertisement-controlled state for a wireless device asset defined as a portion of the wireless device memory. In such aspects, the advertisements that are received, in response to the notification, may include at least one of a audio advertisements, a video advertisements and/or a multimedia advertisements such that the collect size of the advertisement is less than or equal to the size of the portion of the wireless device memory.

A related aspect is provided for by a least one processor configured to provide user-designation of wireless device assets for advertisement allocation and provide advertisements to the designated assets. The processor includes a first module for providing notification of a user-implemented control state change from a user-controlled state to an advertisement-controlled state to one or more user-designated wireless device assets. The processor additionally includes a second module for receiving, in response to the notification, one or more advertisement associated with the one or more wireless device assets and a third module for executing the advertisements associated one or more wireless device assets for a predetermined period of time.

A further related aspect is defined by a computer program product that includes a computer-readable medium. The medium includes at least one instruction for causing a computer to notification of a user-implemented control state change from a user-controlled state to a advertisement-controlled state to one or more user-designated wireless device assets. The medium additionally includes at least one instruction for causing the computer to receive, in response to the notification, one or more advertisement associated with the one or more wireless device assets and at least one instruction for causing the computer to execute the advertisements associated one or more wireless device assets for a predetermined period of time.

Yet another related aspect is provided for by a wireless device apparatus. The apparatus includes means for providing notification of a user-implemented control state change from a user-controlled state to an advertisement-controlled state to one or more user-designated wireless device assets. The apparatus additionally includes means for receiving, in response to the notification, one or more advertisement associated with the one or more wireless device assets and means for executing the advertisements associated one or more wireless device assets for a predetermined period of time.

A wireless device configured for user control of wireless device assets defines a further aspect. The wireless device includes a computer platform including at least one processor and a memory. The wireless device further includes an asset control module stored in the memory and executable by the at least one processor. The asset control module is operable to notify a network entity of a change in control state of one or more wireless device assets from a user-controlled state to an advertisement-controlled state based on user input. The wireless device further includes an advertisement storage included in the memory and operable to receive, in response to the change in control state, one or more advertisements associated with the one or more wireless device assets and an advertisement executor stored in the memory and executable by the at least one processor, wherein the asset advertisement executor is operable to execute the one or more advertisements associated with the one or more user-designated wireless device assets for a predetermined period of time.

Thus, present aspects provide systems, methods and apparatus for controlling content presented on user-controlled wireless device assets and/or features, such as ringtone, wallpaper, wireless device memory and the like. In present aspects, implementing a user-requested control state change from a user-controlled state to an advertisement control state controls content that is presented or stored in the wireless device asset. In this regard, once the user has conceded control of the wireless device asset over to an advertiser or advertisement provider, the advertiser is allowed to provide advertisements to the designated wireless device asset for a predetermined period of time. From the advertiser or advertisement provider perspective present aspects provide for advertisements to be presented on novel platforms. Additionally, by gaining control over the wireless device asset the advertisers or advertisement providers are assured that their advertisements will be executed for the duration of the control period.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
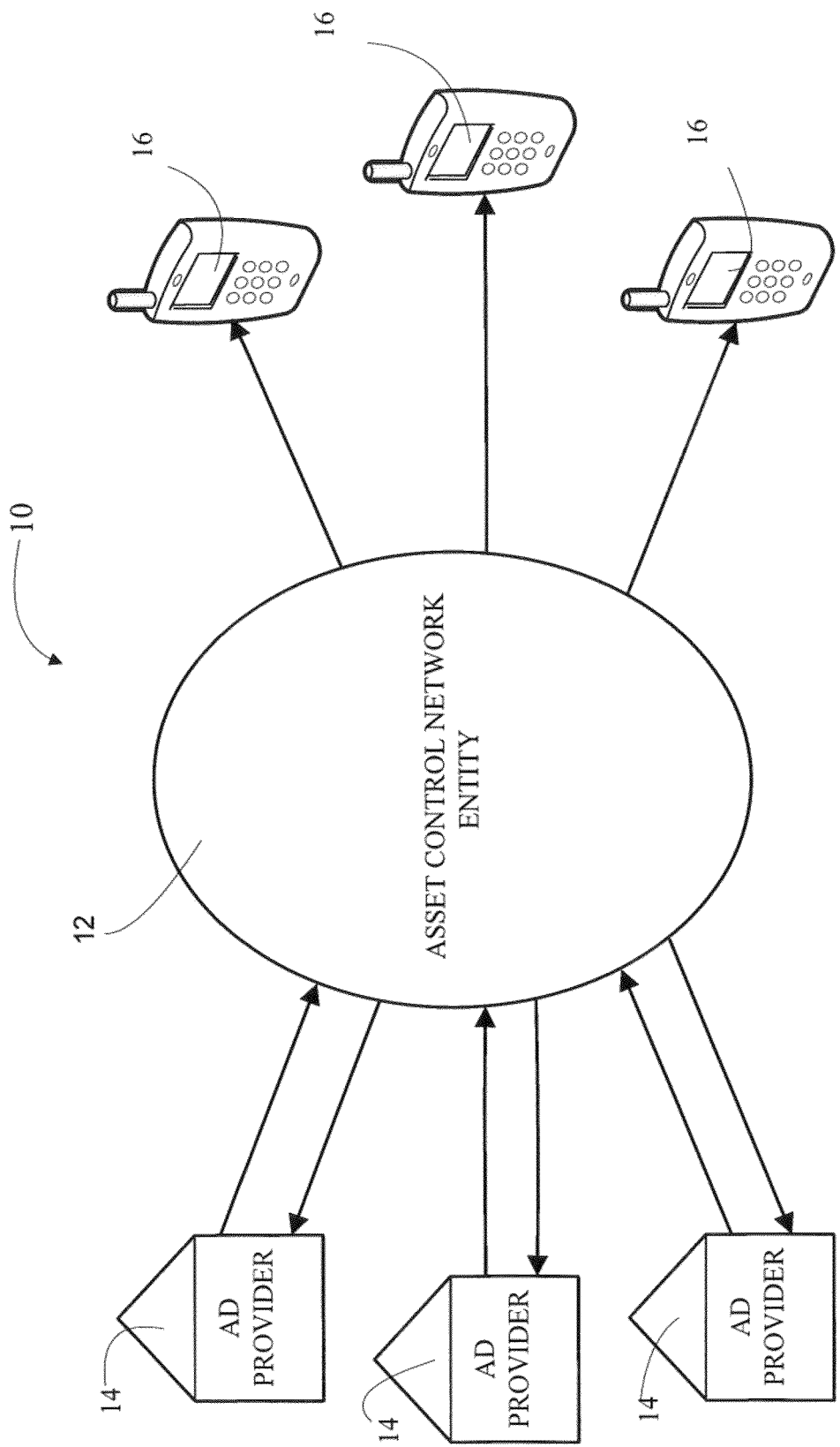
FIG. 1 is a schematic diagram of a system for controlling content on wireless device assets, according to an aspect.

The present devices, apparatus, methods, computer-readable media and process ors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

For purposes of aspects herein disclosed, the following terms are defined. It should be noted that definition of the terms should not be construed as limiting any of the aspects herein described:

Advertisers and advertisement providers—entities that desire to place and/or present advertising content on a wireless device.

Media content operators—entities that provide for delivery and presentation of media content on wireless devices.

Wireless device users—the individual or group of individuals that are commonly in possession of the wireless device or otherwise operate the wireless device.

Wireless device assets—any user-controlled feature, application or mechanism associated with a wireless device and capable of storing, presenting or executing advertisements, such as, display wallpaper, audio ringtones, visual ringtones, multimedia ringtones, memory and the like.

Present aspects provide for methods, systems, apparatus and computer program products for user-controlled content, specifically advertising content, presented on wireless device assets and/or features. In present aspects, implementing a user-requested control state change, from a user-controlled state to an advertisement control state, controls content that is presented or stored in or on the wireless device asset. In this regard, once the user has conceded control of the wireless device asset over to an advertiser or advertisement provider, the advertiser is allowed to provide advertisements to the designated wireless device asset for a predetermined period of time.

Additionally, present aspects may provide for the user of the wireless device to choose or otherwise designate which type of advertisements may be associated with a designated wireless device asset or feature or the amount and/or type of control that the advertiser may be provided for a specific control designation.

As such, present aspects provide advertisers and/or advertisement providers a unique means of presenting advertisements on wireless devices, such as, by way of example, ringtone advertisements, wallpaper advertisements and the like. In addition, present aspects allow the advertiser or advertisement provider to gain control over the user's asset for the predetermined period of time, thus insuring that the advertisements maintain maximum exposure/viewing over the duration of the control period.

FIG. 1 provides a high-level schematic overview of a wireless device asset control system 10 for user-implemented control of wireless device assets, such as ringtones, wallpaper, memory and the like, according to present aspect. The system 10 includes a network entity 12 implemented in a distributed computer network and may comprise one or more network devices and associated databases. The network entity 12 is in network communication with one or more advertisers or advertisement providers 14. In accordance with aspects, the advertisers or advertisement providers 14 may desire to gain control of wireless device assets, such as memory, ringtone, wallpaper, applications and the like, for the purpose of presenting and/or storing advertising content on the asset.

The network entity 12 is additionally in network communication with one or more wireless devices 16. The wireless devices 16 are configured to be operable to change the control state of one or more wireless device assets from a user-controlled state to an advertisement control state and to provide the network entity 12 with notification of the state change. In response to the state change, the network entity 12 may facilitate, through advertisement providers 14, the communication of advertisements to the wireless device for the user-designated advertisement-controlled wireless device asset or, in the instance in which the advertisements are already stored on the wireless device or otherwise accessible to the wireless device, provide the necessary authorization to access and/or execute the advertisements on the wireless device asset.

In some aspects, the wireless device asset state change from user-controlled to advertisement control may be precipitated by an asset state change request sent from network entity 12 to the one or more wireless devices 16. The request may include a one or more compensation schemes applicable if the user chooses to designate one or more wireless device assets as advertisement-controlled. The compensation scheme may be any known or future known compensation scheme, including but not limited to, gratuitous wireless network service, reduced rate wireless network service, reduction in the cost of the wireless device and the like. The compensation scheme serves to entice the user to change the control state of a wireless device asset from user-controlled state to advertisement-controlled state.

Figure 2:
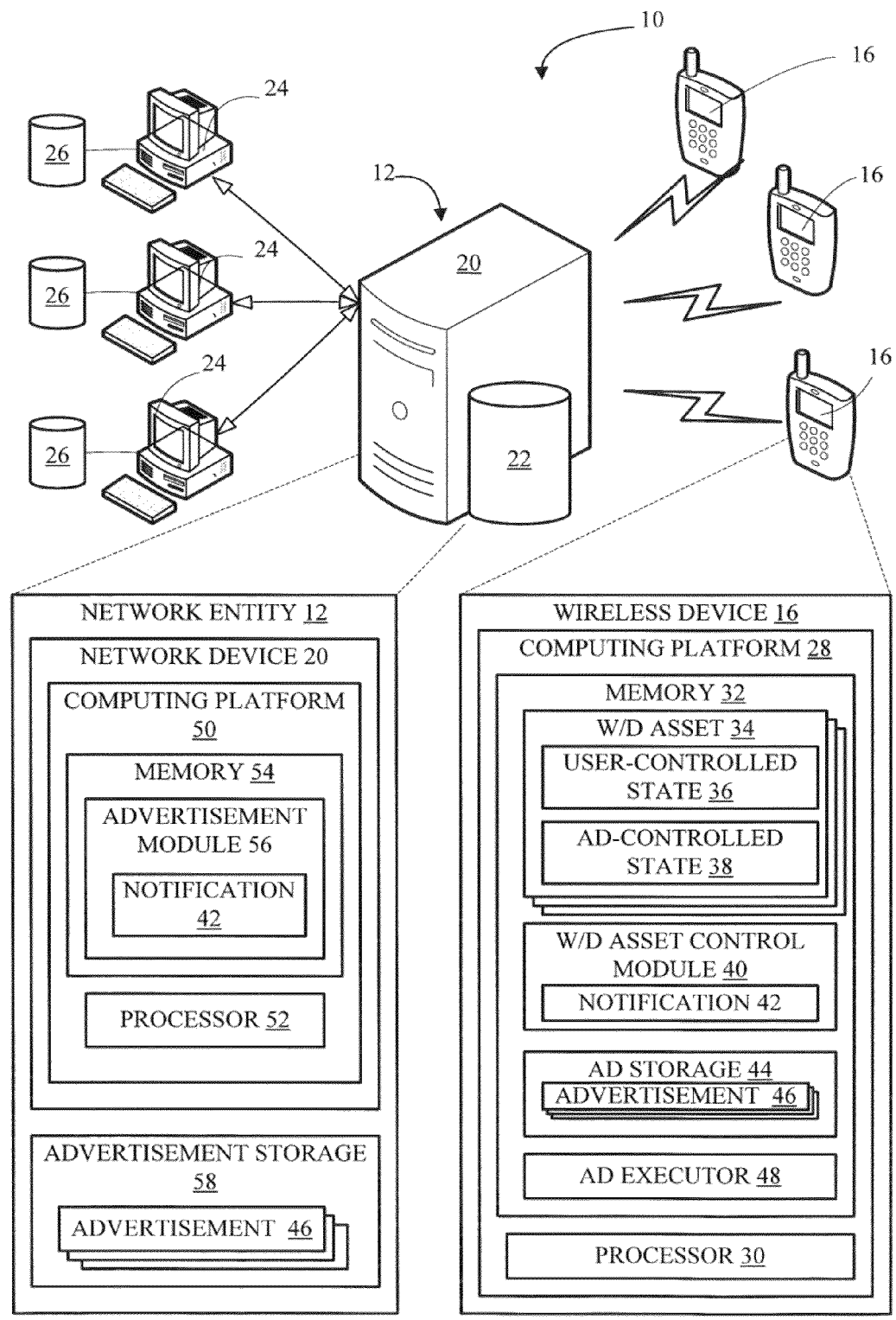
FIG. 2 is a block diagram of a system for controlling content on wireless device assets, according to an aspect.

FIG. 2 provides a block diagram of a system 10 for changing the control state of wireless device assets from a user-controlled state to an advertisement-controlled state, notifying a network entity of the change and providing advertisements to the designated wireless-device assets, according to an aspect. The system 10 includes a network entity 12 including one or more network devices 20, such as servers or the like, and corresponding databases 22. For the sake of clarity, the network entity 12 shown in FIG. 2 is limited to a single network device 20 and database 22, although certain aspects may include multiple network devices 20 and/or databases 22. Additionally, databases 22 may be separate entities or they may be databases included within any of the one or more network devices 20. The network device is in either wired or wireless communication with a plurality of computing devices 24, wherein each computing device is in control of an advertiser or advertisement provider 14 (not shown in FIG. 2). The computing device 24 is in communication with advertisement databases 26 that store advertisements that advertisement providers desire to provide to wireless device assets. Additionally, the network device 20 is in communication, generally at least partially in wireless communication, with wireless devices 16, wherein each wireless device is in the control of a user (not shown in FIG. 2).

Each wireless device 16 includes a computer platform 28 having at least one processor 30 and a memory 32. The memory 32 includes one or more wireless device assets 34 that are operable to either present advertisements or store advertisements. For example, wireless device assets may include, but are not limited to, a ringtone associated with a cellular calling feature, wallpaper that is displayed on a device or a portion of the device's memory capacity. Each wireless device asset may be configured to allow for a user-controlled state 36 and an advertisement-controlled state 38. Alternatively, the user-controlled state 36 and advertisement-controlled state 38 may be controlled externally to the wireless device asset, for example, the wireless device asset control module 40 may be configured to operably control the state of the wireless device assets.

Conventionally, wireless device assets, such as ringtones, wallpapers and memory space and the like, are controlled by the device user. However, present aspects provide for the user to choose or otherwise designate one or more wireless device assets for advertisement control. In such aspects, the user relinquishes control over the asset for a predetermined period of time and the advertiser or advertisement provider gains control of the asset for that predetermined period of time. In this regard, the advertiser or advertisement provider may provide and/or present advertisements to the designated wireless device asset for the predetermined period of time.

The memory 32 of wireless device 16 additionally includes a wireless device asset control module 40 that is operable for providing a notification 42 to the network entity 12 that indicates that one or more wireless device assets have undergone a user-implemented control state change from a user-controlled state to an advertisement-controlled state. Additionally, as previously noted, the wireless device asset control module 40 configured to operably control the state of the wireless device assets, such that when a user implements a change of a wireless device asset control state from user-controlled to advertisement control, the change occurs at the control module level and supersedes the conventional user-control of the asset.

The memory 32 of wireless device 16 additionally includes advertisement storage 44 operable for receiving and storing advertisements 46 associated with a designated advertisement-controlled wireless device asset. In the instance in which the designated advertisement-controlled wireless device aspect is an application or feature for presenting an advertisement, such as a ringtone, a wallpaper or any other audio, video or multimedia application or feature, the advertisement storage will receive and store advertisements 46 that are configured for presentation on the designated asset. In the instances in which the designated advertisement-controlled wireless device asset is a portion of memory the advertisement storage 44 is configured to receive and store any type of advertisements, such as audio, video or multimedia advertisements, up to the allotted portion of memory capacity designated for advertisements The memory 32 of wireless device 16 additionally includes an advertisement executor 48 operable to execute the advertisements 46 associated with the designated advertisement-controlled wireless device asset. For example, in the instance in which the asset is a ringtone, the advertisement executor 48 is operable to play the advertisement ringtone, either in place of or in conjunction with the existing user-selected ringtone, each time the device is called for the duration of the predetermined time period or as dictated by the advertiser and/or user. In another example, in which the asset is wallpaper, the advertisement executor 48 is operable to display the advertisement wallpaper, either in place of or in conjunction with the existing user-selected ringtone, for the duration of the predetermined time period or as dictated by the advertiser and/or user. In a further example, in which the asset is a portion of memory, the advertisement executor 48 is operable to present advertisements, as dictated by applications, such as broadcast/multicast programming applications or the like, for the duration of the predetermined time period or as dictated by the advertiser and/or user.

Each network device 20 includes a computer platform 50 having a processor 52 and memory 54. Memory 54 includes an advertisement module 56 that is executable by the processor 52 and operable to receive the notification 42 from the wireless device indicating that one or more wireless device assets have been user-designated for state control change from a user-controlled state to a advertisement controlled state. In response to the receipt of the notification 42, the advertisement module 56 provides advertisements, or otherwise grants the wireless device 16 access or authorization to execute advertisements, which are associated with the designated advertisement-controlled wireless device asset.

In alternate aspects, as will be discussed infra, the advertisement module may be configured to be operable for sending requests to the wireless devices for changing the control state of one or more wireless device assets. In those aspects, the request may include one or more compensation schemes operable to compensate the user of the device for agreeing to change the control state from user-controlled state to advertisement control state.

In one aspect, the database 22 of network entity 12 may include an advertisement storage 58 operable to store advertisements 46 and provide the advertisements 46 to the wireless devices based on a notification of a control state change. In alternate, aspects of the advertisements may be stored at advertisement databases 26 associated with advertisers or advertisement provides 14. In such aspects, the network 14 may communicate with the advertiser or advertisement provider 14 to retrieve advertisements 46 from the database 26 upon notification that a wireless device has undergone a user-designated control state change.

Figure 3:
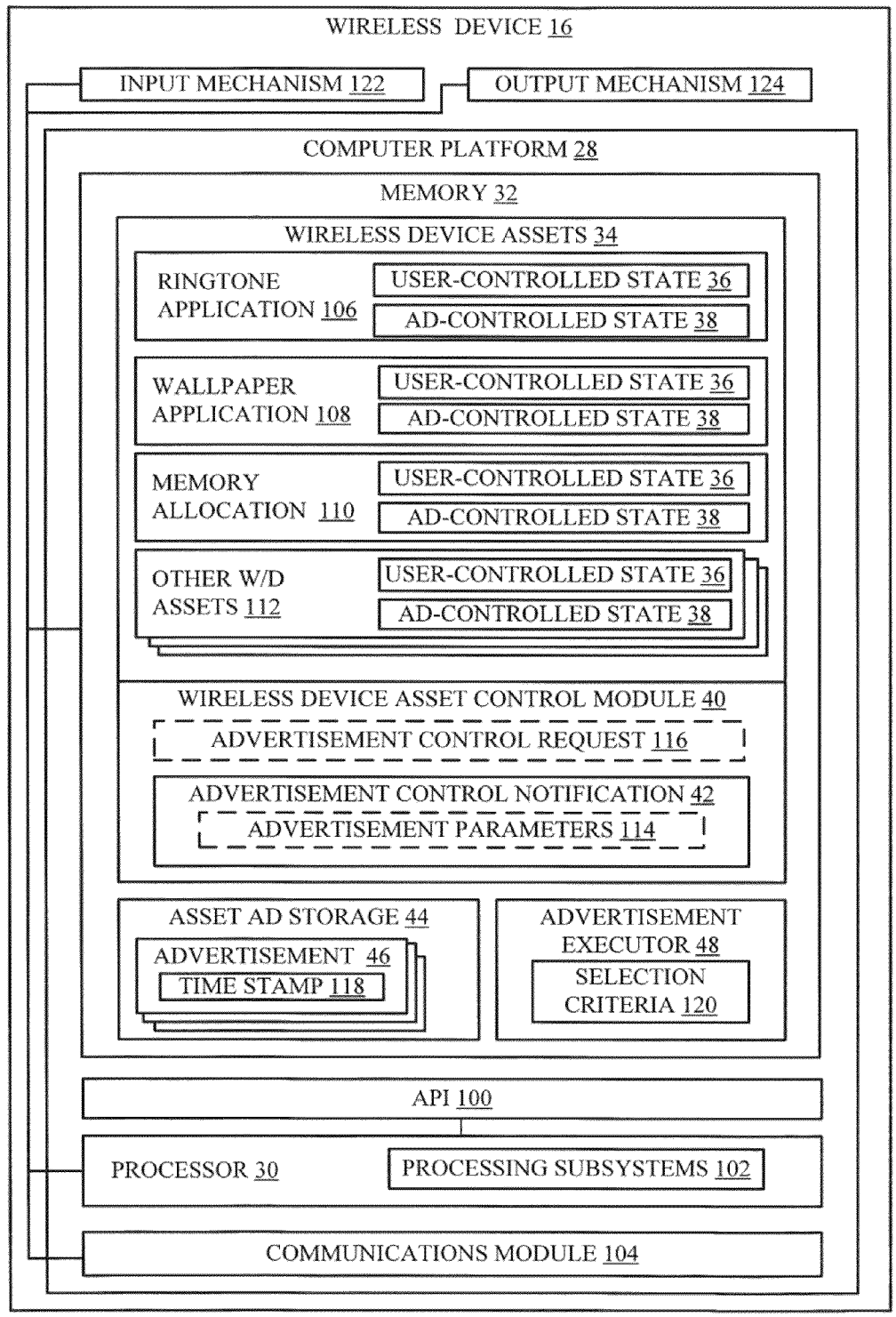
FIG. 3 is a block diagram of a wireless device operable for controlling content on wireless device assets, according to an aspect.

Referring to FIG. 3, according to one aspect, depicted is a detailed block diagram representation of wireless device 16 operable to provide for control state change of wireless device assets from user-controlled to advertisement-controlled. The wireless device 16 may include any type of computerized, communication device configured to receive real-time streaming broadcast content, such as cellular telephone, Personal Digital Assistant (PDA), two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network, such as remote sensors, diagnostic tools, data relays, and the like. The present apparatus and methods for receiving advertising insertion notifications and insert advertising in real-time streaming media content according to the notification can accordingly be performed on any form of wireless device or wireless computer module, including a wireless communication portal, including without limitation, wireless modems, PCMCIA cards, access terminals, desktop computers or any combination or sub-combination thereof.

The wireless device 12 includes computing platform 28 that can transmit data across a wireless network, and that can receive and execute routines and applications. Computer platform 28 includes memory 32, which may comprise volatile and nonvolatile memory such as read-only and/or random-access memory (RAM and ROM), EPROM, EEPROM, flash cards, or any memory common to computer platforms. Further, memory 32 may include one or more flash memory cells, or may be any secondary or tertiary storage device, such as magnetic media, optical media, tape, or soft or hard disk.

Further, computer platform 28 also includes at least one processor 30, which may be an application-specific integrated circuit ("ASIC"), or other chipset, processor, logic circuit, or other data processing device. Processor 30 or other processor such as ASIC may execute an application programming interface ("API") layer 100 that interfaces with any resident programs, such as wireless device asset control module 40 and advertisement executor 48, stored in the memory 32 of wireless device 16. API 100 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 30 includes various processing subsystems 102 embodied in hardware, firmware, software, and combinations thereof, that enable the functionality of wireless device 12 and the operability of the device on a wireless network. For example, processing subsystems 102 allow for initiating and maintaining communications, and exchanging data, with other networked devices. In aspects in which the communication device is defined as a cellular telephone the communications processor 30 may additionally include one or a combination of processing subsystems 102, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 102 of processor 30 may include any subsystem components that interact with the wireless device asset control module 40. Additionally, in some aspects one or more of the wireless device assets 34 may be configured as processing subsystems 102 as opposed to a separate application residing in memory 32.

The computing platform 28 additionally includes communications module 104 operable for receiving and transmitting wireless network communications and, as such, transmitting notifications 42 to the network entity indicating a change in control state. In alternate aspects the communications module 104 may additionally be operable for receiving requests from the network entity for changing the control state of one or more assets to the advertisement-controlled state.

The memory 32 may include one or more wireless device assets 34 that are operable to either present advertisements or store advertisements. As previously noted, optionally, the wireless device assets may be provided for as processing subsystems 102. For example, wireless device assets may include, but are not limited to, a ringtone application asset 106 associated with a cellular calling feature, a wallpaper application asset 108 that provides for the display of an image on the device as a background or memory allocation asset 110 that provides for an allocated portion of the device's memory capacity. Additionally other wireless device asset applications, devices or features 112 capable of presenting or storing advertisements may also be included. Each wireless device asset may be configured to allow for a user-controlled state 36 and an advertisement-controlled state 38. Alternatively, the user-controlled state 36 and advertisement-controlled state 38 may be controlled externally to the wireless device asset, for example, the wireless device asset control module 40 may be configured to operably control the state of the wireless device assets 34.

The memory 32 of wireless device 16 additionally includes a wireless device asset control module 40 that is operable for providing a notification 42 to the network entity 12 that indicates that one or more wireless device assets have undergone a user-implemented control state change from a user-controlled state to an advertisement-controlled state. Additionally, as previously noted, the wireless device asset control module 40 configured to operably control the state of the wireless device assets, such that when a user implements a change of a wireless device asset control state from user-controlled to advertisement control, the change occurs at the control module level and supersedes the conventional user-control of the asset.

The notification 42 that is sent to the network entity may additionally include advertisement parameters 114, such as user-identified parameters that place one or more restrictions on the advertisements, which may be presented or stored on the designated asset. For example, the parameters may designate the type of advertisements that may be presented or stored on the advertisement-controlled asset. Additionally, the parameters 114 may place restrictions and/or limitations on the when or where advertisements can be presented on the advertisement-controlled asset. For example, a user may specify that control of the asset be restricted to certain locations, such as at home or within the vicinity of retail stores, such that advertisements will only be presented on the asset when the device is located at the designated areas. In other example, a user may designate that control of the asset be restricted to weekend or night-time hours, such that advertisements will only be presented on the weekends or between certain specified hours. In other aspects, the advertisement parameters 114 included in the notification 42 may include user profile type information that assists the network in determining which type of advertisement may be of interest to the user of the wireless device in deciding which advertisements to provide to the designated advertisement-controlled assets. In this instance the user-profile information may be based on user inputs provided in conjunction with the designation of advertisement control for a wireless device or the user-profile information may be compiled from information existing on the wireless device, unbeknownst to the user of the wireless device.

The wireless device asset control module 40 may be further operable to receive a request 116 from the network entity for changing the control state of one or more assets from user-controlled state to advertisement-controlled state. The request 116 may include a compensation scheme that serves to entice the user to agree to participate in changing the control state of the wireless device asset from user-control state to advertisement-control state. For example, the compensation scheme may include, but is not limited to, wireless service time, a reduction in wireless service rate, wireless device applications and the like. In alternate aspects, the wireless device may be pre-configured at the manufacture or service provider level such that the asset control module 40 periodically queries the user requesting advertisement-control of an asset or the assets may be configured, such as in the settings mechanism for each asset, to provide for the changing of the control state. Additionally, in these alternate aspects, the device and/or the asset may be configured to present the user with one or more compensation schemes along with the request for advertisement control.

In another alternate aspect, the device may be configured at the point-of-sale of the device and/or the point-of service contract for the wireless service, such that certain assets are designated as advertisement-controlled for the life of the device or service contract or for a predetermined period of time otherwise agreed upon between the seller and the device/service buyer. In this aspect, the agreement to relinquish control of the asset to an advertiser at the point-of-sale or service contract generally provides for user compensation in the form of a decrease in the cost of the wireless device and/or a decrease in wireless service rates. It should be noted that in this aspect, notification to the network entity of a change in control state may be provided manually, in-person or like as opposed to communicating a notification across the wireless network to the network entity.

Thus, in alternate aspects in which the device or assets are pre-configured to provide for control state changes or the device is configured for advertisement control of wireless device assets at the point-of-sale or service contract, it may not be necessary to provide the wireless device with wirelessly requests from the network entity requesting advertisement control of one or more assets.

The memory 32 of wireless device 16 additionally includes advertisement storage 44 operable for receiving and storing advertisements 46 associated with a designated advertisement-controlled wireless device asset. In the instance in which the designated advertisement-controlled wireless device aspect is an application or feature for presenting an advertisement, such as a ringtone, a wallpaper or any other audio, video or multimedia application or feature, the advertisement storage will receive and store advertisements 46 that are configured for presentation on the designated asset. The advertisements 46 may be configured with a timestamp 118 that provides for an expiration date coinciding with the period of time designated for advertisement control. Occurrence of the expiration date associated with the time stamp 118 results in the advertisement no longer being executed and/or stored on the designated wireless device asset. In certain aspects, occurrence of the expiration date in the time stamp 118 may result in the advertisement being deleted from memory. Alternatively, other methods may be used to insure that the advertisement-controlled state of an asset expires upon lapse of the predetermined period of time. For example, the wireless device asset control module 40 may be further operable track and monitor the duration of the advertisement control period, such that control is returned to the user upon lapse of the predetermined time period.

The ringtone asset 106 may support a ringtone advertisement replacement operable for being executed in place of the pre-existing ringtone. For instance, a ringtone advertisement replacement may be a commonly identifiable jingle associated with a product or service, which may be limited to ring tones or may include lyrics. In another example, the ringtone asset may support a ringtone advertisement insertion operable to be inserted periodically during the execution of the pre-existing ringtone. For instance, a product or service name or catch phrase may be inserted periodically throughout the pre-existing ringtone. In a further example, the ringtone asset may support a displayable advertisement that is visually displayed on the device in conjunction with the pre-existing ringtone. The displayable advertisement may be displayed in conjunction with a ringtone advertisement replacement or a ringtone advertisement insertion. It should also be noted that while the term ringtone is conventionally associated with tone made when a call is place to the device, for purposes herein disclosed, ringtone may include any other audible tone, alarm or sound made by the wireless device that is capable of providing a platform for an advertisement.

A wallpaper asset 108 may support a wallpaper advertisement replacement operable for being displayed in place of the pre-existing wallpaper. In another example, a wallpaper asset may support a wallpaper advertisement insertion operable to be under laid or overlaid on the pre-existing wallpaper. For instance, the name of a product or service may be displayed in a repeated pattern in the background of pre-existing wallpaper. It should be noted that while the term wallpaper is conventionally associated with the background displayed on the device's desktop, for purposes herein disclosed, wallpaper may include any other application on the device that provides for the display of user-designated images.

The memory asset 110 may support any video, audio, and/or multimedia advertisement having a collective size less than or equal to the amount of memory allocated to advertisement control.

The memory 32 of wireless device 16 additionally includes an advertisement executor 48 operable to execute the advertisements 46 associated with the designated advertisement-controlled wireless device asset. For example, in the instance in which the asset is a ringtone, the advertisement executor 48 is operable to play the advertisement ringtone, either in place of or in conjunction with the existing user-selected ringtone, each time the device is called for the duration of the predetermined time period or as dictated by the advertiser and/or user. In another example, in which the asset is wallpaper, the advertisement executor 48 is operable to display the advertisement wallpaper, either in place of or in conjunction with the existing user-selected ringtone, for the duration of the predetermined time period or as dictated by the advertiser and/or user. In a further example, in which the asset is a portion of memory, the advertisement executor 48 is operable to present advertisements, as dictated by applications, such as broadcast/multicast programming applications or the like, for the duration of the predetermined time period or as dictated by the advertiser and/or user.

Additionally, the advertiser executor 48 may be operable to present advertisements based on advertiser or advertisement provider presentation criteria also known as selection criteria 120. The presentation criteria may dictate the frequency of presenting a specified advertisement, times of day/week/ month for presenting an advertisement, wireless device location requirements for presenting an advertisement or the like. Presentation criteria 120 may be included within the advertisements 46 as metadata or the presentation criteria may be communicated to the wireless device separately.

Additionally, wireless device 16 has input mechanism 122 for generating inputs into communication device, and output mechanism 124 for generating information for consumption by the user of the communication device. For example, input mechanism 122 may include a mechanism such as a key or keyboard, a mouse, a touch-screen display, a microphone, etc. In certain aspects, the input mechanism 122 provides for user input to change the control state of a wireless device asset from user-controlled state to advertisement-controlled state and to input any parameters related to the advertisements that may be presented on the asset. Further, for example, output mechanism 124 may include a display, an audio speaker, a haptic feedback mechanism, etc. For example, one or more output mechanisms may be operable to present advertisements on the wireless device asset, such as on the display, speaker or the like. Additionally, the output mechanisms provide an interface for choosing wireless device assets for changing state and to display requests for changing asset states.

Figure 4:
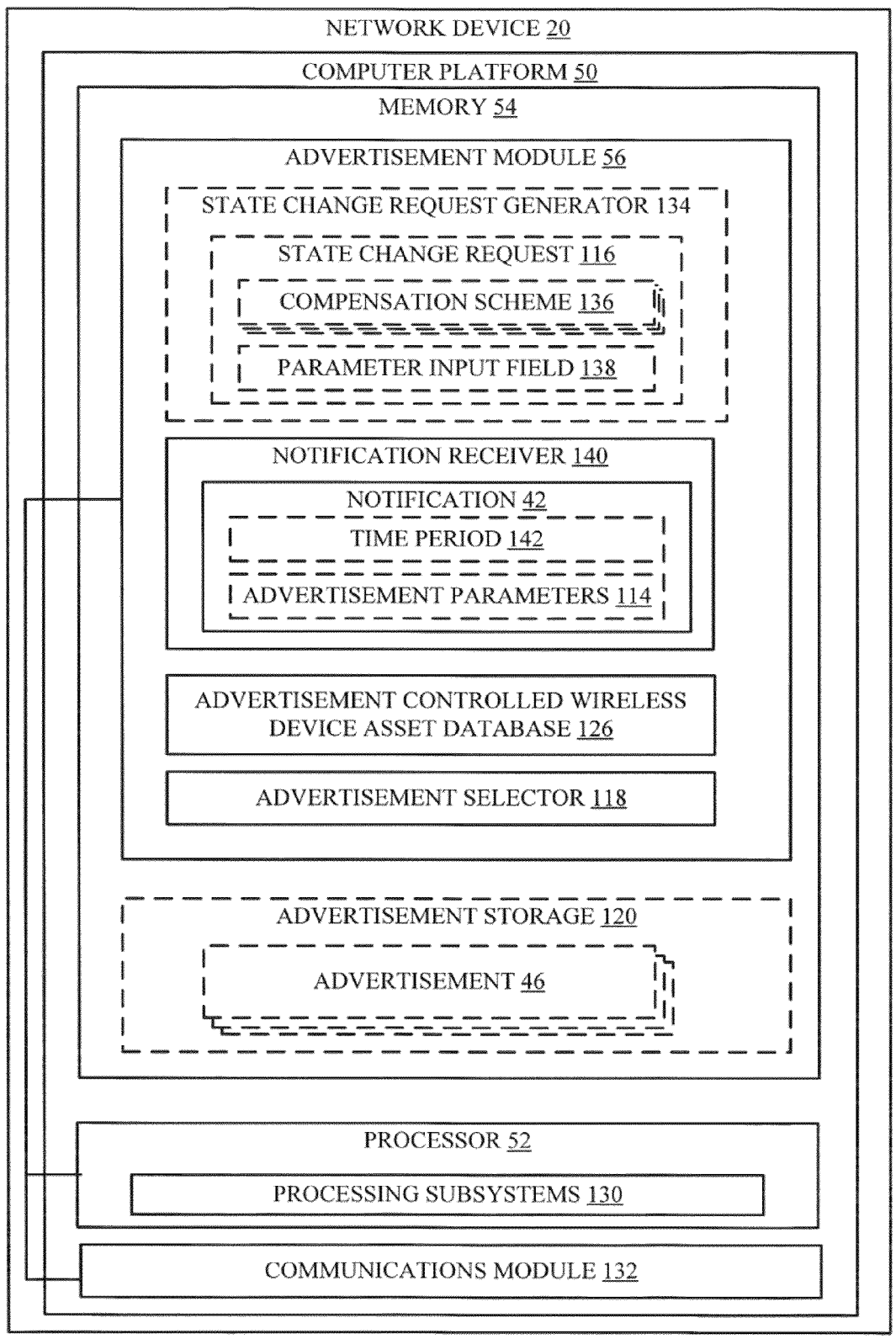
FIG. 4 is a block diagram of a network device operable for providing advertising to wireless device assets that have been designated as advertisement-controlled, according to a further aspect.

Referring to FIG. 4, according to another aspect, a detailed block diagram is illustrated of a network device for providing advertisements to wireless device assets having an advertisement-control state. The network device 20 may comprise at least one of any type of hardware, server, personal computer, mini computer, mainframe computer, or any computing device either special purpose or general computing device. Further, the modules and applications described herein as being operated on or executed by the network device 20 may be executed entirely on the network device 20 or alternatively, in other aspects, separate servers or computer devices may work in concert to provide data in usable formats to parties, and/or to provide a separate layer of control in the data flow between the wireless devices 16 and the modules and applications executed by network device 20.

The network device 20 includes computer platform 50 that can transmit and receive data across a wired or wireless network, and that can execute routines and applications. Computer platform 50 includes a memory 54, which may comprise volatile and nonvolatile memory such as read-only and/or random-access memory (RAM and ROM), EPROM, EEPROM, flash cards, or any memory common to computer platforms. Further, memory 54 may include one or more flash memory cells, or may be any secondary or tertiary storage device, such as magnetic media, optical media, tape, or soft or hard disk.

Further, computer platform 50 also includes a processor 52, which may be an application-specific integrated circuit (ASIC), or other chipset, logic circuit, or other data processing device. Processor 52 includes various processing subsystems 130 embodied in hardware, firmware, software, and combinations thereof, that enable the functionality of network device 20 and the operability of the network device on a wired and/or wireless network. For example, processing subsystems 130 may allow for initiating and maintaining communications, and exchanging data, with other networked devices. For the disclosed aspects, processing subsystems 130 of processor 52 may include any subsystem components that interact with the advertising module 36.

The computer platform 50 further includes a communications module 132 embodied in hardware, firmware, software, and combinations thereof, that enables communications among the various components of network device 20, as well as between the network device 20, and wireless devices 16. The communication module 132 may include the requisite hardware, firmware, software and/or combinations thereof for establishing a wireless communication connection. The communication module 132 is operable to receive notifications 42 from wireless devices 16 that indicate a change to advertisement-control state for one or more wireless device assets asset and transmit advertisements 46 to the wireless device for implementation with the associated asset.

The memory 54 of network device 20 also may include an advertisement module 56 that is executable by the processor 52. The module 56 may optionally include an advertisement control request generator, also known as a state change request generator 134 operable to generator a request 116 for changing the state of one or more wireless device assets from the user-controlled state to the advertisement control state. The request 116 may include one or more compensation schemes 136 that serve to entice the user into participating in the state change. Any known or future known compensation scheme may be used, including but not limited to, gratuitous service time, service rate reduction and the like. The request 116 may additionally include a parameter input field 138 operable to allow the wireless device user to choose or input conditions or limitations pertaining to the state change. For example, the user may choose to limit the type of advertisements that may be presented on the advertisement controlled asset, the time and/or place at which advertisements may be presented on the asset and the like.

The advertisement module 56 additionally includes a notification receiver 140 that is operable to receive notifications 42 from the wireless devices 16. The notifications indicate one or more user-controlled wireless device assets that have been designated for a state change from user-controlled to advertisement controlled. The notification optionally may include a period of time 142 for which the user has agreed to implement the state change. Additionally, the notification may include advertisement parameters 114, such as user-identified parameters that place one or more restrictions on the advertisements that may be presented or stored on the designated asset. For example, the parameters may designate the type of advertisements that may be presented or stored on the advertisement-controlled asset. Additionally, the parameters 114 may place restrictions and/or limitations on the when or where advertisements can be presented on the advertisement-controlled asset. In other aspects, the advertisement parameters 114 included in the notification 42 may include user profile type information that assists the network in determining which type of advertisement may be of interest to the user of the wireless device in deciding which advertisements to provide to the designated advertisement-controlled assets. In this instance the user-profile information may be based on user inputs provided in conjunction with the designation of advertisement control for a wireless device or the user-profile information may be compiled from information existing on the wireless device, unbeknownst to the user of the wireless device.

The advertisement module 56 may additionally include an advertisement-controlled wireless device asset database 126 that logs and tracks wireless device assets that currently have been assigned advertisement control state. In addition to tracking the currently assigned assets that database 126 also provides for tracking of any limitations or conditions placed on the advertisements that may be presented on the wireless device asset.

Additionally, the advertisement module 56 includes an advertisement selector 118 operable to select advertisements for the designated advertisement-controlled assets based on the asset identified and the limitations/conditions placed on the advertisements that may be presented. Each individual asset will generally be associated with a particular type of advertisement, for example, wallpaper is associated with a video/image advertisement, ringtone is associated with an audio advertisement and the like. Once the selector 118 has identified the advertisements, the advertisements 46 may be retrieved from a local advertisement storage 120, another network entity-based advertisement storage 58 and/or an advertiser or advertisement provider database 26. Once retrieved, the advertisements 46 may be communicated to the wireless devices. In alternate aspects, the wireless device may already store or have access to the advertisements, in which case it may not be necessary for the network device 20 to communicate the selected advertisements.

Figure 5:
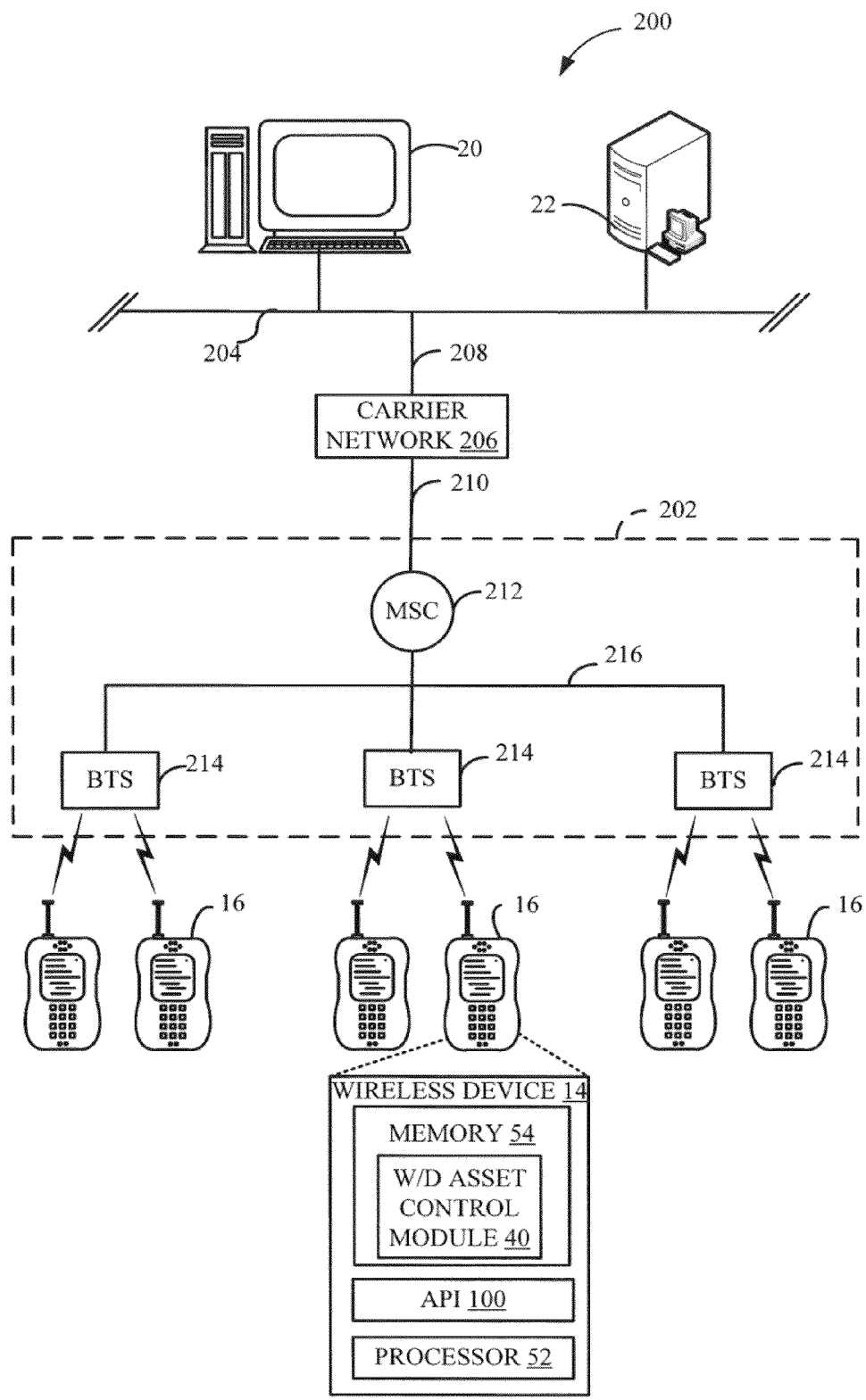
FIG. 5 is a block diagram of an exemplary communications network for providing advertisements to wireless device assets, according to an aspect.

Referring to FIG. 5, in one aspect, wireless devices 16 comprise a cellular telephone. A cellular telephone system 200 may include wireless network 202 connected to a wired network 204 via a carrier network 206. Wireless devices 16 are being manufactured with increased computing capabilities and often can communicate packets including voice and data over wireless network 202. As described earlier, these "smart" wireless devices 16 have APIs 100 resident on their local computer platform 50 that allow software developers to create software applications that operate on the cellular telephone 16, and control certain functionality on the device. FIG. 5 is a representative diagram that more fully illustrates the components of a cellular wireless network and the interrelation of the elements of one aspect of the present system. Cellular wireless network 200 is merely exemplary and can include any system whereby remote modules, such as wireless devices 16 communicate over-the-air between and among each other and/or between and among components of a wireless network 202, including, without limitation, wireless network carriers and/or servers.

In system 200, network device 20 can be in communication over a wired network 204 (e.g. a local area network, LAN) with a separate data repository 22 for storing advertisement-control wireless device asset records, advertisements and the like. Network device 20 and data repository 22 may be present on the cellular telephone system 200 with any other network components that are needed to provide cellular telecommunication services. Network device 16 communicates with carrier network 206 through a data links 208 and 210, which may be data links such as the Internet, a secure LAN, WAN, or other network. Carrier network 206 controls messages (generally being data packets) sent to a mobile switching center ("MSC") 212. Further, carrier network 206 communicates with MSC 212 by a network 210, such as the Internet, and/or POTS ("plain old telephone service"). Typically, in network 210, a network or Internet portion transfers data, and the POTS portion transfers voice information. MSC 212 may be connected to multiple base stations ("BTS") 214 by another network 216, such as a data network and/or Internet portion for data transfer and a POTS portion for voice information. BTS 214 ultimately transmits messages wirelessly to the wireless devices, such as wireless devices 16, by short messaging service ("SMS"), or other over-the-air methods.

Figure 6:
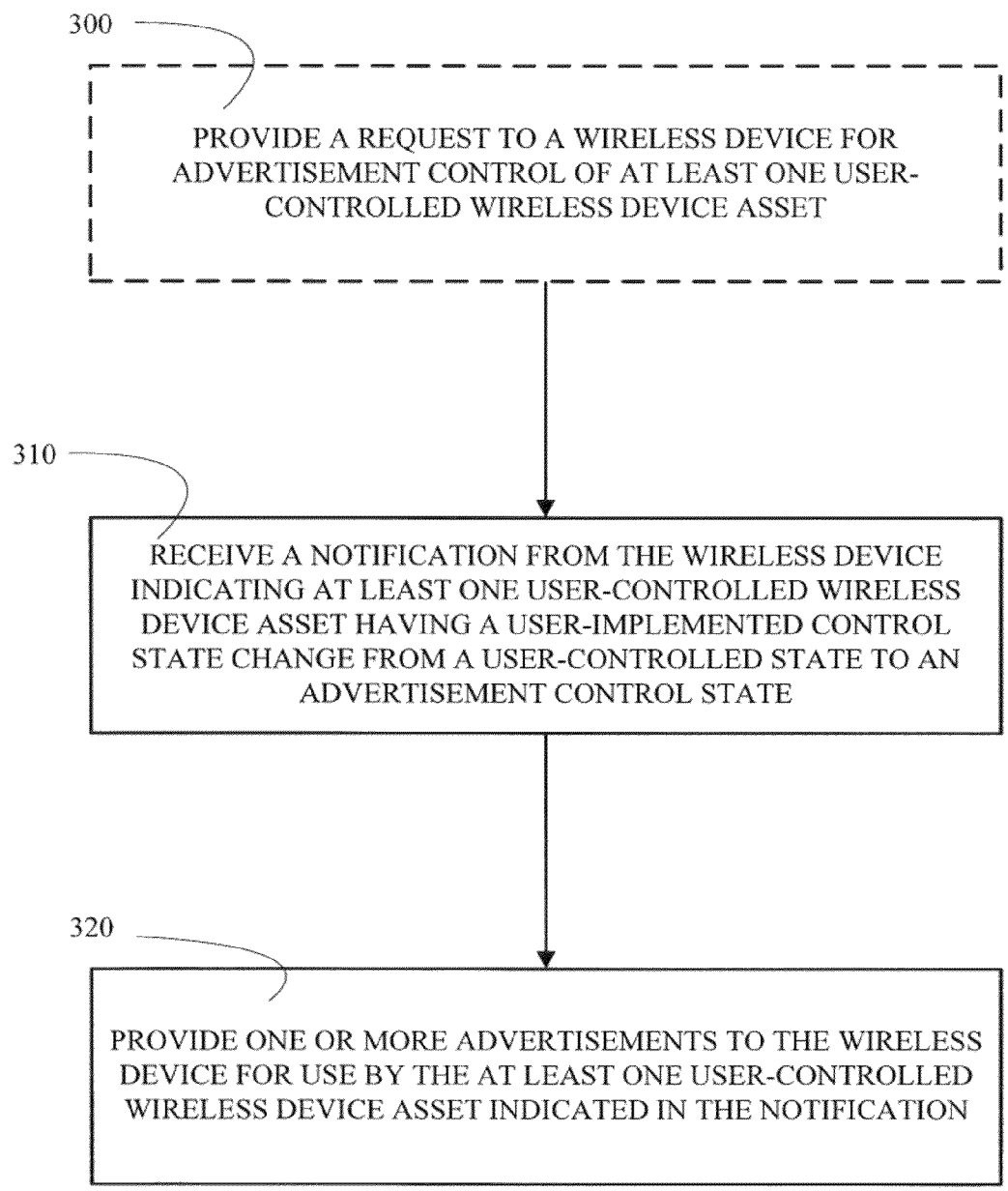
FIG. 6 is a flow diagram of a method for notifying a network entity of a change in control state for one or more wireless device assets, according to an aspect.

FIG. 6 is a flow diagram depicting a method for receiving, at a network entity, an advertisement-control state change notification from a wireless device and providing advertisements to the device for the associated assets. At optional Event 300, the network entity provides a request to a wireless device for advertisement control of at least one user-controlled wireless device asset, such as ringtone, wallpaper, memory or the like. The request may include one or more compensation schemes for compensating the user of the wireless device if the user chooses to change the control state of an asset to the advertisement-controlled state. In other aspects, the need to provide a request to the wireless device may be obviated by including state change options within the asset settings or the asset control module. Additionally, as previously discussed, the device may be pre-configured at the point-of-sale or contract to provide for a state change from user-controlled to advertisement controlled At Event 310, a network entity receives a notification from the wireless device that indicates at least one user-controlled wireless device asset has been designated for a state change from user-controlled state to advertisement-controlled state. The notification may also include a period of time for designating the asset as advertisement controlled. The notification, or alternatively a separate notification/communication, may include parameters, such as user-determined parameters, which may define the type of advertisements that may be associated with the asset or define criteria, such as time, location and the like, for the type of advertisements that may be presented on the device.

At Event 320, the network entity provides the wireless device access to advertisements for use by the assets that have been designated as advertisement controlled assets. The network entity may provide the advertisements to the wireless device at the onset of the advertisement control period or the entity may provide advertisements on an on-going basis. By updating the advertisements and providing advertisements on an on-going basis the advertiser is able to provide time-sensitive advertisements, a series of sequential advertisements or the like. Additionally, if the network entity has access to or receives wireless device location or other user and/or device related information, the network entity can tailor the advertisements that are provided to the wireless device based on the location of the device or other user and/or device related information.

Figure 7:
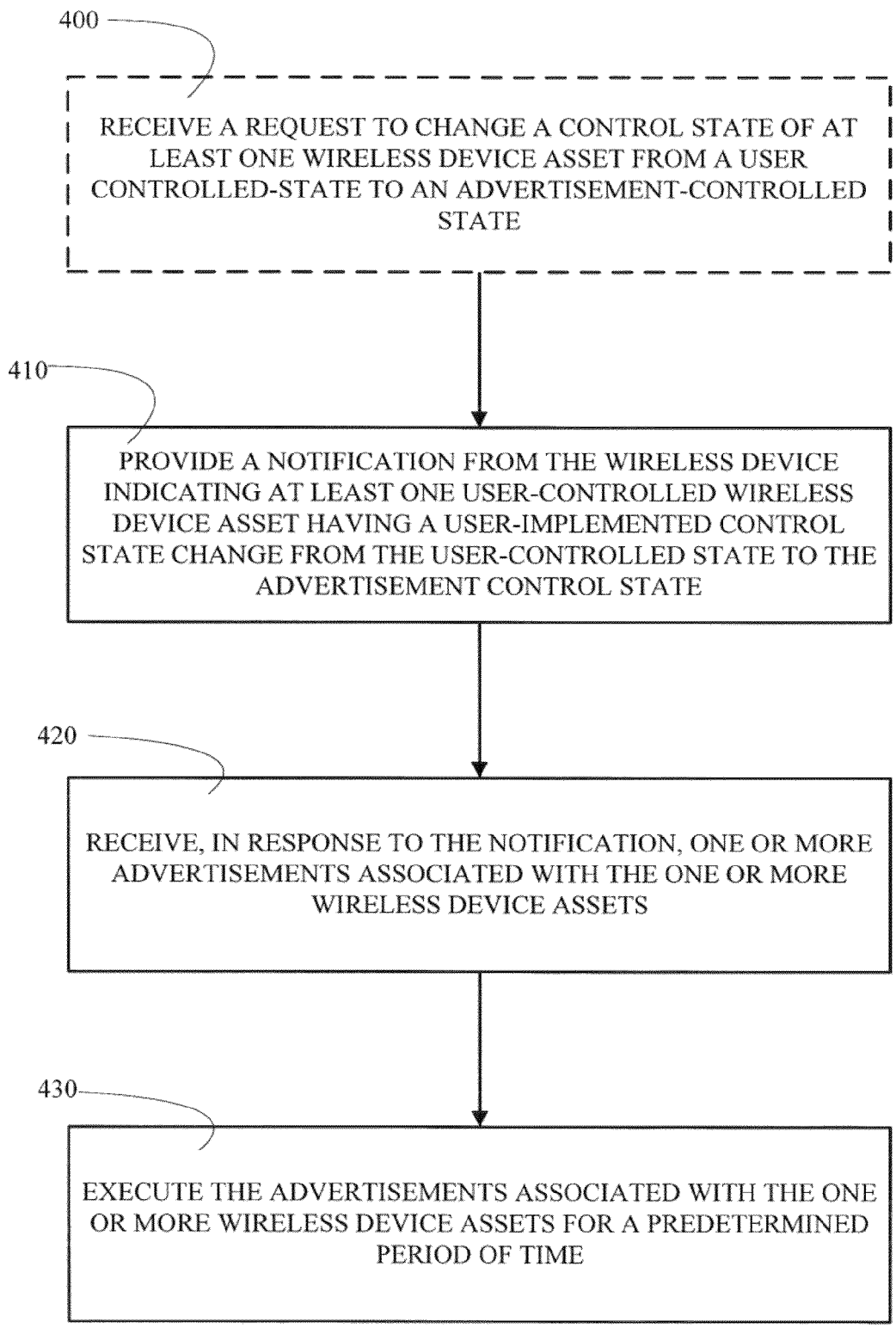
FIG. 7 is a flow diagram of a method for providing advertisements to wireless device assets based on a change in control state, according to yet another aspect.

FIG. 7 provides a flow diagram of a method for providing a network entity notification of a change in wireless asset control state to an advertisement state and receiving advertisements associated with the asset in response to the notification, according to an aspect. At optional Event 400, the wireless device receives a request to change control state of at least one wireless device asset from a user-controlled state to an advertisement-controlled state. The request may include one or more compensation schemes that are provided to the user as compensation for agreeing to change the control state of an asset from user-controlled to advertisement-controlled. As previously noted, receiving a request for changing the control state to advertisement-controlled state may not be necessary in aspects in which the asset setting provide the state change option or another application running on the device, such as the wireless device asset control module, provides for a state change option.

At Event 410, the wireless device provides a notification to the network entity indicating at least one user-controlled wireless device asset being user-designated for a control state change from the user-control state to the advertisement control state. As previously noted the wireless device assets may include ringtones, wallpaper, an allocated portion of memory or any other feature, application or device capable of presenting or storing advertisements. In addition to the notification identifying the wireless device assets, the notification may identify the time period for the state change. Additionally, the notification, or a separate notification/communication, may include one or more one or more parameters related to the type of advertisements that may be provided to or presented on the wireless device asset or other limitations that the user may place on the asset, such as the time of day, week, month, etc. in which advertisements may be presented on the asset or the location of the device at which advertisements may be presented on the asset.

At Event 420, in response to the notification, the wireless device receives one or more advertisements associated with the one or more wireless device assets. The ringtone asset 106 may support a ringtone advertisement replacement operable for being executed in place of the pre-existing ringtone. In another example, the ringtone asset may support a ringtone advertisement insertion operable to be inserted periodically during the execution of the pre-existing ringtone. In a further example, the ringtone asset may support a displayable advertisement that is visually displayed on the device in conjunction with the pre-existing ringtone. A wallpaper asset may support a wallpaper advertisement replacement operable for being displayed in place of the pre-existing wallpaper. In another example, the wallpaper asset may support a wallpaper advertisement insertion operable to be under laid or overlaid on the pre-existing wallpaper. The memory asset may support any video, audio, and/or multimedia advertisement having a collective size less than or equal to the amount of memory allocated to advertisement control.

At Event 430, the advertisements associated with the one or more advertisement-controlled are executed on the wireless device. Execution of the advertisements may coincide with the occurrence of related wireless device asset. For example, the execution of the ringtone may provide for a ringtone advertisement or the display of the wallpaper may provide for the display of the wallpaper advertisement. In the instance in which the asset is a portion of device memory, execution of the stored advertisements may occur based on advertising slots occurring in applications, broadcasts or the like. Additionally, the execution of the advertisements may occur based on any parameters placed the presentation of the advertisements by the network entity and/or the device user. For example, the advertisements may only executed at specific times or when the device is located at specific locations.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide methods, systems, apparatus and computer program products are described for controlling content presented on user-controlled wireless device assets and/or features, such as ringtone, wallpaper, wireless device memory and the like. In present aspects, a user-requested control state change is undertaken from a user-controlled state to an advertisement-control state. In this regard, once the user has conceded control of the wireless device asset over to an advertiser or advertisement provider, the advertiser is allowed to provide advertisements to the designated wireless device asset for a predetermined p period of time. From the advertiser or advertisement provider perspective present aspects provide for advertisements to be presented on novel platforms. Additionally, by gaining control over the wireless device asset the advertisers or advertisement providers are assured that their advertisements will be executed for the duration of the control period.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing advertisements, comprising:
   receiving a notification from a wireless device of a user, the notification indicating at least one user-controlled wireless device asset of the wireless device having a user-implemented control state change from a user-controlled state to an advertisement-controlled state,
   wherein the at least one user-controlled wireless device asset relates to a feature or function of the wireless device, wherein the advertisement-controlled state includes a state in which the user concedes execution control of the at least one user-controlled wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein receiving a notification further comprises receiving user-determined advertisement parameters defining acceptable advertisements for the at least one user controlled wireless device asset; and providing one or more advertisements to the wireless device for use by the at least one user-controlled wireless device asset indicated in the notification, wherein each advertisement includes an associated timestamp operable to expire after the user-designated period of time for the advertisement-controlled state, and wherein providing one or more advertisements to the wireless device further comprises providing a ringtone advertisement to the wireless device that comprises at least one of an advertisement ringtone that is operable to be executed in place of a pre-existing wireless device ringtone, a visual advertisement that is operable to be visually displayed on the wireless device in conjunction with the execution of the pre-existing wireless device ringtone or an advertisement ringtone insertion that is operable to be periodically inserted during the execution of a wireless device ringtone.

2. The method of claim 1, wherein receiving the notification further comprises receiving the notification from the wireless device indicating the at least one user-controlled wireless device asset is a ringtone.

3. A method for providing advertisements, comprising:
receiving a notification from a wireless device of a user, the notification indicating at least one user-controlled wireless device asset of the wireless device having a user-implemented control state change from a user-controlled state to an advertisement-controlled state, wherein the at least one user-controlled wireless device asset relates to a feature or function of the wireless device, wherein the advertisement-controlled state includes a state in which the user concedes execution control of the at least one user-controlled wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein receiving a notification further comprises receiving user-determined advertisement parameters defining acceptable advertisements for the at least one user controlled wireless device asset; and providing one or more advertisements to the wireless device for use by the at least one user-controlled wireless device asset indicated in the notification, wherein each advertisement includes an associated timestamp operable to expire after the user-designated period of time for the advertisement-controlled state, and wherein providing one or more advertisements to the wireless device further comprises providing a wallpaper advertisement to the wireless device that comprises at least one of a wallpaper advertisement that is operable to be displayed on the wireless device in place of a pre-existing wireless device wallpaper or a wallpaper advertisement overlay that is operable to be displayed on the wireless device in conjunction with the pre-existing wireless device wallpaper.

4. The method of claim 3, wherein receiving the notification further comprises receiving the notification from the wireless device indicating the at least one user-controlled wireless device asset is a wallpaper.

5. A method for providing advertisements, comprising:
receiving a notification from a wireless device of a user, the notification indicating at least one user-controlled wireless device asset of the wireless device having a user-implemented control state change from a user-controlled state to an advertisement-controlled state, wherein the at least one user-controlled wireless device asset relates to a feature or function of the wireless device, wherein the advertisement-controlled state includes a state in which the user concedes execution control of the at least one user-controlled wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein receiving the notification further comprises receiving user-determined advertisement parameters defining acceptable advertisements for the at least one user controlled wireless device asset; and providing one or more advertisements to the wireless device for use by the at least one user-controlled wireless device asset indicated in the notification, wherein each advertisement includes an associated timestamp operable to expire after the user-designated period of time for the advertisement-controlled state, and wherein providing one or more advertisements to the wireless device further comprises providing one or more advertisements collectively having a size less than or equal to a portion of wireless device memory.

6. The method of claim 5, receiving the notification further comprises receiving the notification from the wireless device indicating the at least one user-controlled wireless device asset is the portion of wireless device memory.

7. A method for a user-implemented control state change of wireless device assets of a wireless device of a user, comprising:
providing a notification of a user-implemented control state change from a user-controlled state to an advertisement-controlled state for at least one user-controlled wireless device asset of the wireless device of the user, wherein the at least one user-controlled wireless device asset relates to a feature or function of the wireless device, wherein the advertisement-controlled state includes a state in which the user concedes execution control of the at least one wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein providing a notification further comprises providing user-determined advertisement parameters defining acceptable advertisements for the at least one user-controlled wireless device asset;

receiving, by a receiver associated with the wireless device, in response to the notification, one or more advertisements associated with the at least one user-controlled wireless device asset, wherein each advertisement includes an associated timestamp operable to expire after the user-designated period of time for the advertisement-controlled state; and executing the one or more advertisements associated with the at least one user-controlled wireless device asset for the predetermined period of time, wherein receiving, in response to the notification, one or more advertisements, further comprises receiving a ringtone advertisement comprising at least one of a ringtone advertisement insertion operable to be periodically executed during a pre-existing ringtone, a visual advertisement operable to be displayed in conjunction with the pre-existing ringtone or a ringtone advertisement replacement operable to be executed in the place of the pre-existing ringtone.

8. The method of claim 7, further comprising receiving a request to change the control state of the at least one user-controlled wireless device asset of the wireless device from the user-controlled state to the advertisement-controlled state prior to providing the notification.

9. The method of claim 7, wherein receiving the request further comprises receiving the request including an offer to compensate the user for agreeing to change the control state from the user-controlled state to the advertisement-controlled state for one or more of the wireless device assets.

10. The method of claim 7, wherein providing the notification further comprises providing the notification that includes a user-determined time period for the user-implemented control state change.

11. The method of claim 7, wherein providing the notification further comprises providing notification of a user-implemented control state change from a user-controlled state to a advertisement-controlled state for a wireless device asset defined as a ringtone.

12. The method of claim 7, wherein executing the advertisement associated with the one or more wireless device assets for a predetermined period of time further comprises preventing the user from overriding the execution of the advertisements for the predetermined time.

13. A method for a user-implemented control state change of wireless device assets of a wireless device of a user, comprising:

providing a notification of a user-implemented control state change from a user-controlled state to an advertisement-controlled state for at least one user-controlled wireless device asset of the wireless device of the user, wherein the at least one user-controlled wireless device asset relates to a feature or function of the wireless device, wherein the advertisement-controlled state includes a state in which the user concedes execution control of the at least one wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein providing a notification further comprises providing user-determined advertisement parameters defining acceptable advertisements for the at least one user-controlled wireless device asset;

receiving, by a receiver associated with the wireless device, in response to the notification, one or more advertisements associated with the at least one user-controlled wireless device asset, wherein each advertisement includes an associated timestamp operable to expire after the user-designated period of time for the advertisement-controlled state; and executing the one or more advertisements associated with the at least one user-controlled wireless device asset for the predetermined period of time, wherein receiving, in response to the notification, one or more advertisements, further comprises receiving a wallpaper advertisement comprising at least one of a wallpaper advertisement overlay operable to be displayed in conjunction with pre-existing wallpaper or a wallpaper advertisement replacement operable to be displayed in the place of pre-existing wallpaper.

14. The method of claim 13, wherein providing the notification further comprises providing notification of a user-implemented control state change from a user-controlled state to an advertisement-controlled state for a wireless device asset defined as a wallpaper.

15. A method for a user-implemented control state change of wireless device assets of a wireless device of a user, comprising:

providing a notification of a user-implemented control state change from a user-controlled state to an advertisement-controlled state for at least one user-controlled wireless device asset of the wireless device of the user, wherein the at least one user-controlled wireless device asset relates to a feature or function of the wireless device, wherein the advertisement-controlled state includes a state in which the user concedes execution control of the at least one wireless device asset to an advertisement provider such that the user is prohibited from modifying the execution control of the at least one user-controlled wireless device asset for a predetermined time, the predetermined time being a user-designated period of time for the advertisement-controlled state associated with the at least one user-controlled wireless device asset, and wherein providing a notification further comprises providing user-determined advertisement parameters defining acceptable advertisements for the at least one user-controlled wireless device asset;

receiving, by a receiver associated with the wireless device, in response to the notification, one or more advertisements associated with the at least one user-controlled wireless device asset, wherein each advertisement includes an associated timestamp operable to expire after the user-designated period of time for the advertisement-controlled state; and executing the one or more advertisements associated with the at least one user-controlled wireless device asset for the predetermined period of time, wherein receiving, in response to the notification, one or more advertisements, further comprises receiving at least one of audio advertisements, video advertisements or multimedia advertisements, wherein the collective size of the advertisements is less than or equal to the portion of the wireless device memory.

16. The method of claim 15, wherein providing the notification further comprises providing notification of a user-implemented control state change from a user-controlled state to a advertisement-controlled state for a wireless device asset defined as the portion of wireless device memory.

17. At least one processor configured to provide user-designation of wireless device assets for advertisement allocation and provide advertisements to the designated wireless device assets, comprising:
   a first module for providing a notification of a user-implemented control state change from a user-controlled state to an advertisement-controlled state for at least one user-designated wireless device asset,
   wherein the at least one user-designated wireless device asset relates to a feature of a wireless device of a user,
   wherein the advertisement-controlled state includes a state in which the user concedes execution control of the at least one user-designated wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset, and
   wherein providing the notification further comprises providing the notification that includes a user-defined time period for the user-implemented control state change;
   a second module comprising hardware for receiving, in response to the notification, one or more advertisements associated with the one or more user-designated wireless device assets, wherein each advertisement includes an associated timestamp operable to expire after the user-designated period of time for the advertisement-controlled state,
   wherein receiving, in response to the notification, one or more advertisements comprises receiving a ringtone advertisement comprising at least one of a ringtone advertisement insertion operable to be periodically executed during a pre-existing ringtone, a visual advertisement operable to be displayed in conjunction with the pre-existing ringtone or a ringtone advertisement replacement operable to be executed in the place of the pre-existing ringtone; and
   a third module for executing the one or more advertisements associated with the one or more user-designated wireless device assets for a predetermined period of time.

18. A non-transitory computer-readable medium, comprising:
   at least one instruction for causing a computer to provide a notification of a user-implemented control state change from a user-controlled state to an advertisement-controlled state for at least one user-designated wireless device asset,
   wherein the at least one user-designated wireless device asset relates to a feature of a wireless device of a user, and
   wherein the advertisement-controlled state includes a state in which the user concedes execution control of the at least one user-designated wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset, and
   wherein providing the notification comprises providing user-determined advertisement parameters defining acceptable advertisements for the at least one user-controlled wireless device asset;
   at least one instruction for causing the computer to receive, in response to the notification, one or more advertisements associated with the at least one user-designated wireless device asset, wherein each advertisement includes an associated timestamp operable to expire after the user-designated period of time for the advertisement-controlled state,
   wherein receiving, in response to the notification, one or more advertisements comprises receiving a ringtone advertisement comprising at least one of a ringtone advertisement insertion operable to be periodically executed during a pre-existing ringtone, a visual advertisement operable to be displayed in conjunction with the pre-existing ringtone or a ringtone advertisement replacement operable to be executed in the place of the pre-existing ringtone; and
   at least one instruction for causing the computer to execute the at least one user-designated wireless device asset for the predetermined period of time.

19. An apparatus, comprising:
   means for providing a notification of a user-implemented control state change from a user-controlled state to an advertisement-controlled state for at least one user-designated wireless device asset,
   wherein the at least one user-designated wireless device asset relates to a feature of a wireless device of a user,
   wherein the advertisement-controlled state is a state in which the user concedes execution control of the at least one wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset, and
   wherein providing the notification comprises providing user-determined advertisement parameters defining acceptable advertisements for the at least one user-controlled wireless device asset;
   means for receiving, in response to the notification, one or more advertisement associated with the at least one user-designated wireless device asset, wherein each advertisement includes an associated timestamp operable to expire after the user-designated period of time for the advertisement-controlled state,
   wherein receiving, in response to the notification, one or more advertisements comprises receiving a ringtone advertisement comprising at least one of a ringtone advertisement insertion operable to be periodically executed during a pre-existing ringtone, a visual advertisement operable to be displayed in conjunction with the pre-existing ringtone or a ringtone advertisement replacement operable to be executed in the place of the pre-existing ringtone; and
   means for executing the one or more advertisements associated with the at least one user-designated wireless device asset for the predetermined period of time.

20. A wireless device configured for user control of wireless device assets of the wireless device, comprising:
   a computer platform including at least one processor and a memory;
   at least one user-designated wireless device asset operable for providing for at least one of presenting or storing advertisements and operable for changing a control state between a user-controlled state and an advertisement-controlled state, wherein the at least one user-designated wireless device asset relates to a feature of the wireless device, and wherein the advertisement-controlled state includes a state in which the user concedes execution control of the at least one user-designated wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset;

an asset control module stored in the memory and executable by the at least one processor, the asset control module operable to notify a network entity of a change in a control state of at least one user-designated wireless device asset from the user-controlled state to the advertisement-controlled state based on user input, wherein the asset control module is further operable to notify the network entity of user-determined advertisement parameters defining acceptable advertisements for the at least one user-designated wireless device asset;

an advertisement storage included in the memory and operable to receive, in response to the change in the control state, one or more advertisements associated with the at least one user-designated wireless device asset, wherein each advertisement includes an associated timestamp operable to expire after the user-designated period of time for the advertisement-controlled state, wherein the advertisement storage is further operable to receive, in response to the change in control state, one or more ringtone advertisements comprising at least one of a ringtone advertisement insertion operable to be periodically executing during a pre-existing ringtone, a visual advertisement operable to be displayed in conjunction with the pre-existing ringtone or a ringtone advertisement replacement operable to be executed in the place of the pre-existing ringtone; and an advertisement executor stored in the memory and executable by the at least one processor, wherein the advertisement executor is operable to execute the one or more advertisements associated with the at least one user-designated wireless device asset for the predetermined period of time.

21. The wireless device of claim 20, wherein the asset control module is further operable to receive a user-implemented request to change the control state of the at least one user-designated wireless device asset from the user-controlled state to the advertisement controlled state prior to providing the notification.

22. The wireless device of claim 20, wherein the asset control module is further operable to notify the network entity of a user-determined time period for the control state change.

23. The wireless device of claim 20, wherein the asset control module is further operable to notify the network entity of a user-implemented control state change from a user-controlled state to an advertisement-controlled state for a wireless device asset defined as a ringtone.

24. The wireless device of claim 20, wherein the advertisement executor is executable by the at least one processor to execute the one or more advertisements associated with the at least one user-designated wireless device asset in response to the changing of the control state from the user-controlled state to the advertisement-controlled state, and wherein the at least one user-designated wireless device asset is operable for presenting the one or more advertisements executed by the advertisement executor during the advertisement-controlled state in response to the changing of the control state from the user-controlled state to the advertisement-controlled state.

25. A wireless device configured for user control of wireless device assets of the wireless device, comprising:

a computer platform including at least one processor and a memory;

at least one user-designated wireless device asset operable for providing for at least one of presenting or storing advertisements and operable for changing a control state between a user-controlled state and an advertisement-controlled state, wherein the at least one user-designated wireless device asset relates to a feature of the wireless device, and wherein the advertisement-controlled state includes a state in which the user concedes execution control of the at least one user-designated wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset;

an asset control module stored in the memory and executable by the at least one processor, the asset control module operable to notify a network entity of a change in a control state of at least one user-designated wireless device asset from the user-controlled state to the advertisement-controlled state based on user input, wherein the asset control module is further operable to notify the network entity of user-determined advertisement parameters defining acceptable advertisements for the at least one user-designated wireless device asset;

an advertisement storage included in the memory and operable to receive, in response to the change in the control state, one or more advertisements associated with the at least one user-designated wireless device asset, wherein each advertisement includes an associated timestamp operable to expire after the user-designated period of time for the advertisement-controlled state, wherein the advertisement storage is further operable to receive, in response to the change in control state, one or more wallpaper advertisements comprising at least one of a wallpaper advertisement overlay operable to be displayed in conjunction with pre-existing wallpaper or a wallpaper advertisement replacement operable to be displayed in the place of pre-existing wallpaper; and an advertisement executor stored in the memory and executable by the at least one processor, wherein the advertisement executor is operable to execute the one or more advertisements associated with the at least one user-designated wireless device asset for the predetermined period of time.

26. The wireless device of claim 25, wherein the asset control module is further operable to notify the network entity of a user-implemented control state change from a user-controlled state to an advertisement-controlled state for a wireless device asset defined as wallpaper.

27. The wireless device of claim 25, wherein the advertisement executor is executable by the at least one processor to execute the one or more advertisements associated with the at least one user-designated wireless device asset in response to the changing of the control state from the user-controlled state to the advertisement-controlled state, and wherein the at least one user-designated wireless device asset is operable for presenting the one or more advertisements executed by the advertisement executor during the advertisement-controlled state in response to the changing of the control state from the user-controlled state to the advertisement-controlled state.

28. A wireless device configured for user control of wireless device assets of the wireless device, comprising:

a computer platform including at least one processor and a memory;

at least one user-designated wireless device asset operable for providing for at least one of presenting or storing advertisements and operable for changing a control state between a user-controlled state and an advertisement-controlled state, wherein the at least one user-designated wireless device asset relates to a feature of the wireless device, and wherein the advertisement-controlled state includes a state in which the user concedes execution control of the at least one user-designated wireless device asset to an advertisement provider such that the user is prohibited from modifying the execution control of the at least one user-designated wireless device asset for a predetermined time, the predetermined time being a user-designated period of time for the advertisement-controlled state associated with the at least one user-controlled wireless device asset;

an asset control module stored in the memory and executable by the at least one processor, the asset control module operable to notify a network entity of a change in a control state of at least one user-designated wireless device asset from the user-controlled state to the advertisement-controlled state based on user input, wherein the asset control module is further operable to notify the network entity of user-determined advertisement parameters defining acceptable advertisements for the at least one user-designated wireless device asset;

an advertisement storage included in the memory and operable to receive, in response to the change in the control state, one or more advertisements associated with the at least one user-designated wireless device asset, wherein each advertisement includes an associated timestamp operable to expire after the user-designated period of time for the advertisement-controlled state, wherein the advertisement storage is further operable to receive, in response to the change in control state, one or more advertisements comprising at least one of audio advertisements, video advertisements or multimedia advertisements, wherein the collective size of the advertisements is less than or equal to the portion of the wireless device memory; and an advertisement executor stored in the memory and executable by the at least one processor, wherein the advertisement executor is operable to execute the one or more advertisements associated with the at least one user-designated wireless device asset for the predetermined period of time.

29. The wireless device of claim 28, wherein the asset control module is further operable to notify the network entity of a user-implemented control state change from a user-controlled state to a advertisement-controlled state for a wireless device asset defined as a portion of wireless device memory.

30. The wireless device of claim 28, wherein the advertisement executor is executable by the at least one processor to execute the one or more advertisements associated with the at least one user-designated wireless device asset in response to the changing of the control state from the user-controlled state to the advertisement-controlled state, and wherein the at least one user-designated wireless device asset is operable for presenting the one or more advertisements executed by the advertisement executor during the advertisement-controlled state in response to the changing of the control state from the user-controlled state to the advertisement-controlled state.

* * * * *